United States Patent
Li et al.

(10) Patent No.: US 12,406,398 B2
(45) Date of Patent: Sep. 2, 2025

(54) POINT CLOUD ATTRIBUTE ENTROPY ENCODING METHOD AND DEVICE, AND POINT CLOUD ATTRIBUTE ENTROPY DECODING METHOD AND DEVICE

(71) Applicant: Peking University Shenzhen Graduate School, Shenzhen (CN)

(72) Inventors: Ge Li, Shenzhen (CN); Chuang Ma, Shenzhen (CN); Jing Wang, Shenzhen (CN); Yiting Shao, Shenzhen (CN)

(73) Assignee: Peking University Shenzhen Graduate School (CN)

( * ) Notice: Subject to any disclaimer, the term of this patent is extended or adjusted under 35 U.S.C. 154(b) by 388 days.

(21) Appl. No.: 18/011,397

(22) PCT Filed: Mar. 11, 2022

(86) PCT No.: PCT/CN2022/080268
§ 371 (c)(1),
(2) Date: Dec. 19, 2022

(87) PCT Pub. No.: WO2022/188848
PCT Pub. Date: Sep. 15, 2022

(65) Prior Publication Data
US 2023/0326085 A1    Oct. 12, 2023

(30) Foreign Application Priority Data

Mar. 12, 2021    (CN) .......................... 202110269745.8

(51) Int. Cl.
*G06T 9/00* (2006.01)
(52) U.S. Cl.
CPC ...................... *G06T 9/00* (2013.01)

(58) Field of Classification Search
CPC ........ H04N 19/96; H04N 19/51; H04N 19/91; H04N 19/30; H04N 19/34; H04N 19/53;
(Continued)

(56) References Cited

U.S. PATENT DOCUMENTS

| 2021/0195197 A1* | 6/2021 | Kato ...................... H04N 19/46 |
| 2022/0167016 A1* | 5/2022 | Zhang .................. H04N 19/119 |
| 2022/0222861 A1 | 7/2022 | Yu et al. |

FOREIGN PATENT DOCUMENTS

| CN | 112352431 A | 2/2021 |
| CN | 112449754 A | 3/2021 |
| CN | 112995662 A | 6/2021 |

* cited by examiner

*Primary Examiner* — Duy M Dang
(74) *Attorney, Agent, or Firm* — The Belles Group, P.C.

(57) ABSTRACT

The present invention provides a point cloud attribute entropy encoding method and device, and a point cloud attribute entropy decoding method and device. The encoding method comprises: if an overall encoding processing condition of point cloud attribute residual coefficients is satisfied, performing overall encoding processing on the point cloud attribute residual coefficients, and then ending the encoding; and if not, performing local one-by-one encoding processing on the point cloud attribute residual coefficients until the encoding is ended. The entropy decoding method comprises: if an overall decoding processing condition of the point cloud attribute residual coefficients is satisfied, performing overall decoding processing on the point cloud attribute residual coefficients, and then ending the decoding; and if not, performing local one-by-one decoding processing on the point cloud attribute residual coefficients until the decoding is ended. The present invention better utilizes redundant information in a point cloud and improves compression performance.

9 Claims, 4 Drawing Sheets

(58) Field of Classification Search
CPC ....... H04N 19/647; G06T 17/005; G06T 9/40;
G06T 9/00; G06T 3/40; G06T 9/001;
G06T 9/002; G06T 15/00; G06T 15/005;
G06T 15/08; G06T 17/00; G06T 17/20;
G06T 2200/04; G06T 2207/20081; G06T
2207/20084; G06F 40/146
See application file for complete search history.

POINT CLOUD ATTRIBUTE ENTROPY ENCODING METHOD AND DEVICE, AND POINT CLOUD ATTRIBUTE ENTROPY DECODING METHOD AND DEVICE

CROSS-REFERENCE TO RELATED PATENT APPLICATIONS

The present application is a U.S. national stage application under 35 U.S.C. § 371 of PCT Application No. PCT/CN2022/080268, filed Mar. 11, 2022, which claims priority to Chinese Patent Application No. 202110269745.8, filed Mar. 12, 2021. The disclosures of the aforementioned priority applications are incorporated herein by reference in their entireties.

TECHNICAL FIELD

The present invention relates to the technical field of point cloud processing, in particular to a point cloud attribute entropy encoding method and device, and a point cloud attribute entropy decoding method and device.

BACKGROUND ART

A three-dimensional point cloud is an important manifestation of digitization in the real world. With the rapid development of a three-dimensional scanning device (laser, radar, etc.), the precision and resolution ratio of the point cloud are higher. High-precision point cloud processing is widely applied to the construction of an urban digital map and plays a technical support role in various hot researches such as smart cities, unmanned driving and heritage preservation. A point cloud is acquired by sampling the surface of an object by the three-dimensional scanning device, the number of points of a frame of point cloud is generally on the million level, wherein each point includes geometrical information and attribute information such as a color and a reflectivity, and therefore, the data volume is very huge. The huge data volume of the three-dimensional point cloud brings great challenge for data storage, transmission, etc., and therefore, point cloud compression is essential.

Point cloud compression is mainly divided into geometrical compression and attribute compression. At present, an attribute compression frame described in a test platform TMC13v12 (Test Model for Category 1 & 3 version 12) provided by an international standard organization (Moving Picture Experts Group, MPEG) mainly includes a lifting transform strategy based on asymptotic level expression (Level of Detail, called LOD for short) and a predicting transform strategy based on LOD, the cores of both are to generate attribute prediction values firstly, and then subtract the attribute prediction values from actual attribute values of the current point to obtain attribute residual coefficients. Entropy encoding is performed on the attribute residual coefficients. Similarly, on a decoding end, attribute prediction values are generated firstly, and then, the attribute prediction values are added with decoded attribute residual coefficients to obtain final attribute values.

When the attribute residual coefficients are encoded and decoded, compression frames of an attribute entropy encoder and decoder of a point cloud mainly perform entropy encoding and decoding based on the number of continuous zero.

Meanwhile, at present, there also has been a point cloud attribute compression method described in a test platform PCRM v1.0 provided by the Chinese AVS (Audio Video coding Standard) point cloud compression working team, it mainly adopts a point cloud attribute compression method based on a predicting or transforming method, and its core is to encode attribute residual coefficients and decode the attribute residual coefficients. However, the attribute residual coefficients are encoded or decoded by adopting a direct encoding or decoding form.

Direct encoding and decoding methods in the prior art are low in compression performance. In view of the above-mentioned situations, the present invention designs a novel point cloud attribute entropy encoder and decoder so that the attribute entropy encoder and decoder provided by the present invention are more efficient.

SUMMARY OF THE INVENTION

The purpose of the present invention is to disclose a point cloud attribute entropy encoding method and device, and a point cloud attribute entropy decoding method and device, by which the compression performance of a point cloud attribute is improved.

Technical solutions provided by the present invention are described as follows.

One aspect of the present invention provides a point cloud attribute entropy encoding method and a point cloud attribute entropy decoding method with each including: determining structures of an attribute entropy encoder and decoder; determining an attribute entropy encoding method and an attribute entropy decoding method; and performing encoding and decoding.

Another aspect of the present invention provides a point cloud attribute entropy encoding device and a point cloud attribute entropy decoding device with each including a processor, a memory and a communication bus; the memory storing a computer readable program executable for the processor; the communication bus implementing connection communication between the processor and the memory; and the processor, when executing the computer readable program, implementing the steps of the point cloud attribute entropy encoding method and the steps of the point cloud attribute entropy decoding method.

A point cloud attribute entropy encoding method includes:
- C4: for attribute residual coefficients $A_1, A_2, \ldots, A_M$ of the current point, M being an integer greater than 1, if the M attribute residual coefficients are not equal to 0 at the same time, encoding a flag bit Fk by utilizing contexts to represent whether $A_k$ (0<k<=M) is equal to 0;
- C5: if $A_k$ is not equal to 0, adaptively selecting contexts to encode uncoded residual coefficients of the current point by utilizing encoded attribute residual coefficients of the current point;
- C7: if $A_k$ is equal to 0, encoding a flag bit Fj by utilizing contexts to represent whether $A_j$ (0<j<=M, and j is not equal to k) is equal to 0;
- C10: if $A_j$ is not equal to 0, adaptively selecting contexts to encode the uncoded attribute residual coefficients other than $A_k$ of the current point by utilizing the encoded attribute residual coefficients of the current point; and
- C8: if $A_j$ is equal to 0, adaptively selecting contexts to encode the uncoded attribute residual coefficients other than $A_j$ and $A_k$ of the current point by utilizing the encoded attribute residual coefficients of the current point.

Preferably, before step C4, method 1 is further included:
C2: for attribute residual coefficients $A_1, A_2, \ldots, A_M$ of the current point, M being an integer greater than 1, if the M attribute residual coefficients of the current point are equal to 0 at the same time, encoding a flag bit FM by utilizing contexts to represent whether $A_1, A_2, \ldots, A_M$ are equal to 0 at the same time.

Preferably, before step C4, method 2 is further included:
C1': for attribute residual coefficients $A_1, A_2, \ldots, A_M$ of the current point, M being an integer greater than 1, if the M attribute residual coefficients of the current point are equal to 0 at the same time, recording the number of points to which the M continuous attribute residual coefficients of the current point are equal to 0 at the same time; and
C2': if the M attribute residual coefficients of the current point are not equal to 0 at the same time, encoding the number of continuous points to which the M continuous attribute residual coefficients of the current point are equal to 0 at the same time.

Preferably, if the attribute residual coefficient ($A_1$ or $A_2, \ldots,$ or $A_M$) of the current point is equal to 0, the attribute residual coefficient is taken as an entropy encoding value, and the entropy encoding value is encoded;
when the encoded attribute residual coefficient ($A_1$ or $A_2, \ldots,$ or $A_M$) is not equal to 0 and no flag bits are provided, an absolute value of the attribute residual coefficient is taken as an entropy encoding value, and the entropy encoding value and a sign bit (positive or negative) of the corresponding attribute residual value are encoded; and when the encoded attribute residual coefficient ($A_1$ or $A_2, \ldots,$ or $A_M$) is not equal to 0 and flag bits are provided, a difference obtained by subtracting 1 from the absolute value of the attribute residual coefficient is taken as an entropy encoding value, and the entropy encoding value and a sign bit (positive or negative) of the corresponding attribute residual value are encoded.

Preferably, the step of encoding the entropy encoding value specifically includes: encoding a flag bit by utilizing contexts to represent whether the entropy encoding value is equal to 0;
if the entropy encoding value is not equal to 0, encoding a flag bit by utilizing contexts to represent whether the entropy encoding value is equal to 1;
if the entropy encoding value is not equal to 1, encoding a flag bit by utilizing contexts to represent whether the entropy encoding value is equal to 2;
performing the operation successively until a flag bit is encoded by utilizing contexts to represent whether the entropy encoding value is equal to n (n is greater than 0); and
if the entropy encoding value is not equal to n, encoding a difference obtained by subtracting n+1 from this value.

Preferably, the step of adaptively selecting contexts to encode uncoded residual coefficients of the current point by utilizing encoded attribute residual coefficients of the current point specifically includes:
for an encoded attribute residual coefficient $A_t$ of the current point, setting H flag bits $b_{t0}, b_{t1}, \ldots, b_{t(H-1)}$, wherein $b_{th}$ represents whether $A_t$ is equal to h, and h=0, 1, $\ldots$, H−1; and
for r encoded attribute residual coefficients of the current point, encoding the uncoded residual coefficients of the current point by taking r*H flag bits as contexts.

A point cloud attribute entropy encoding device includes a processor, a memory and a communication bus; the memory stores a computer readable program executable for the processor; the communication bus implements connection communication between the processor and the memory; and
the processor, when executing the computer readable program, implements the steps of the point cloud attribute entropy encoding method.

A point cloud attribute entropy decoding method includes the following steps:
D5: for attribute residual coefficients $A_1, A_2, \ldots, A_M$ of the current point, M being an integer greater than 1, decoding a flag bit Fk by utilizing contexts to represent whether $A_k$ (0<k<=M) is equal to 0;
D6: if $A_k$ is not equal to 0, adaptively selecting contexts to decode undecoded residual coefficients of the current point by utilizing decoded attribute residual coefficients of the current point;
D8: if $A_k$ is equal to 0, decoding a flag bit Fj by utilizing contexts to represent whether $A_j$ (0<j<=M, and j is not equal to k) is equal to 0;
D11: if $A_j$ is not equal to 0, adaptively selecting contexts to decode the undecoded attribute residual coefficients other than $A_k$ of the current point by utilizing the decoded attribute residual coefficients of the current point; and
D9: if $A_j$ is equal to 0, adaptively selecting contexts to decode the undecoded attribute residual coefficients other than $A_j$ and $A_k$ of the current point by utilizing the decoded attribute residual coefficients of the current point.

Preferably, before step D5, method 3 is further included:
D2: for attribute residual coefficients $A_1, A_2, \ldots, A_M$ of the current point, M being an integer greater than 1, decoding a flag bit FM by utilizing contexts to represent whether $A_1, A_2, \ldots, A_M$ are equal to 0 at the same time.

Preferably, before step D5, method 4 is further included:
D2': for attribute residual coefficients $A_1, A_2, \ldots, A_M$ of the current point, M being an integer greater than 1, performing decoding to obtain the number of points to which the M continuous attribute residual coefficients of the current point are equal to 0 at the same time.

Preferably, decoding is performed to obtain an entropy decoding value, and when the entropy decoding value is equal to 0, the entropy decoding value is taken as the attribute residual coefficient $A_1$ or $A_2, \ldots,$ or $A_M$;
when the entropy decoding value is not equal to 0 and no flag bits are provided, the entropy decoding value is taken as an absolute value of the attribute residual coefficient $A_1$ or $A_2, \ldots,$ or $A_M$, and decoding is performed to obtain a sign bit (positive or negative) of the attribute residual coefficient $A_1$ or $A_2, \ldots,$ or $A_M$; and
when the entropy decoding value is not equal to 0 and flag bits are provided, a sum obtained by adding 1 to the entropy decoding value is taken as the absolute value of the attribute residual coefficient $A_1$ or $A_2, \ldots,$ or $A_M$, and decoding is preformed to obtain a sign bit (positive or negative) of the attribute residual coefficient $A_1$ or $A_2, \ldots,$ or $A_M$.

Preferably, the step that decoding is performed to obtain an entropy decoding value specifically includes:
decoding a flag bit by utilizing contexts to represent whether the entropy decoding value is equal to 0;

if the entropy decoding value is not equal to 0, decoding a flag bit by utilizing contexts to represent whether the entropy decoding value is equal to 1;

if the entropy decoding value is not equal to 1, decoding a flag bit by utilizing contexts to represent whether the entropy decoding value is equal to 2;

performing the operation successively until a flag bit is decoded by utilizing contexts to represent whether the entropy decoding value is equal to n (n is greater than 0); and if the entropy decoding value is not equal to n, taking a sum obtained by adding n+1 to a value obtained by decoding as the entropy decoding value.

Preferably, the step of adaptively selecting contexts to decode undecoded residual coefficients of the current point by utilizing decoded attribute residual coefficients of the current point specifically includes:

for a decoded attribute residual coefficient $A_t$ of the current point, setting H flag bits $b_{t0}, b_{t1}, \ldots, b_{t(H-1)}$, wherein $b_{th}$ represents whether $A_t$ is equal to h, and h=0, 1, ..., H−1; and for r decoded attribute residual coefficients of the current point, decoding the undecoded attribute residual coefficients of the current point by taking r*H flag bits as contexts.

A point cloud attribute entropy decoding device includes a processor, a memory and a communication bus; the memory stores a computer readable program executable for the processor;

the communication bus implements connection communication between the processor and the memory; and the processor, when executing the computer readable program, implements the steps of the point cloud attribute entropy decoding method.

Compared with the prior art, the present invention has the beneficial effects: according to the point cloud attribute entropy encoding method and device, and the point cloud attribute entropy decoding method and device provided by the present invention, redundant information in a point cloud is better utilized, and the compression performance is improved.

BRIEF DESCRIPTION OF THE DRAWINGS

In order to describe the technical solutions in the embodiments of the present invention more clearly, the accompanying drawings required for describing the embodiments or the prior art will be briefly introduced below. Apparently, the accompanying drawings in the following description show only some embodiments of the present invention, and the ordinary skill in the art can still derive other accompanying drawings from these accompanying drawings without creative efforts.

DETAILED DESCRIPTION OF THE INVENTION

The present invention is further described below with conjunction with the accompanying drawings, the embodiments are preferred implementations of the present invention, there may be other implementations according to the conception of the present invention, and the embodiments given in the present description do not limit the scope of the present invention in any forms.

Figure 1:
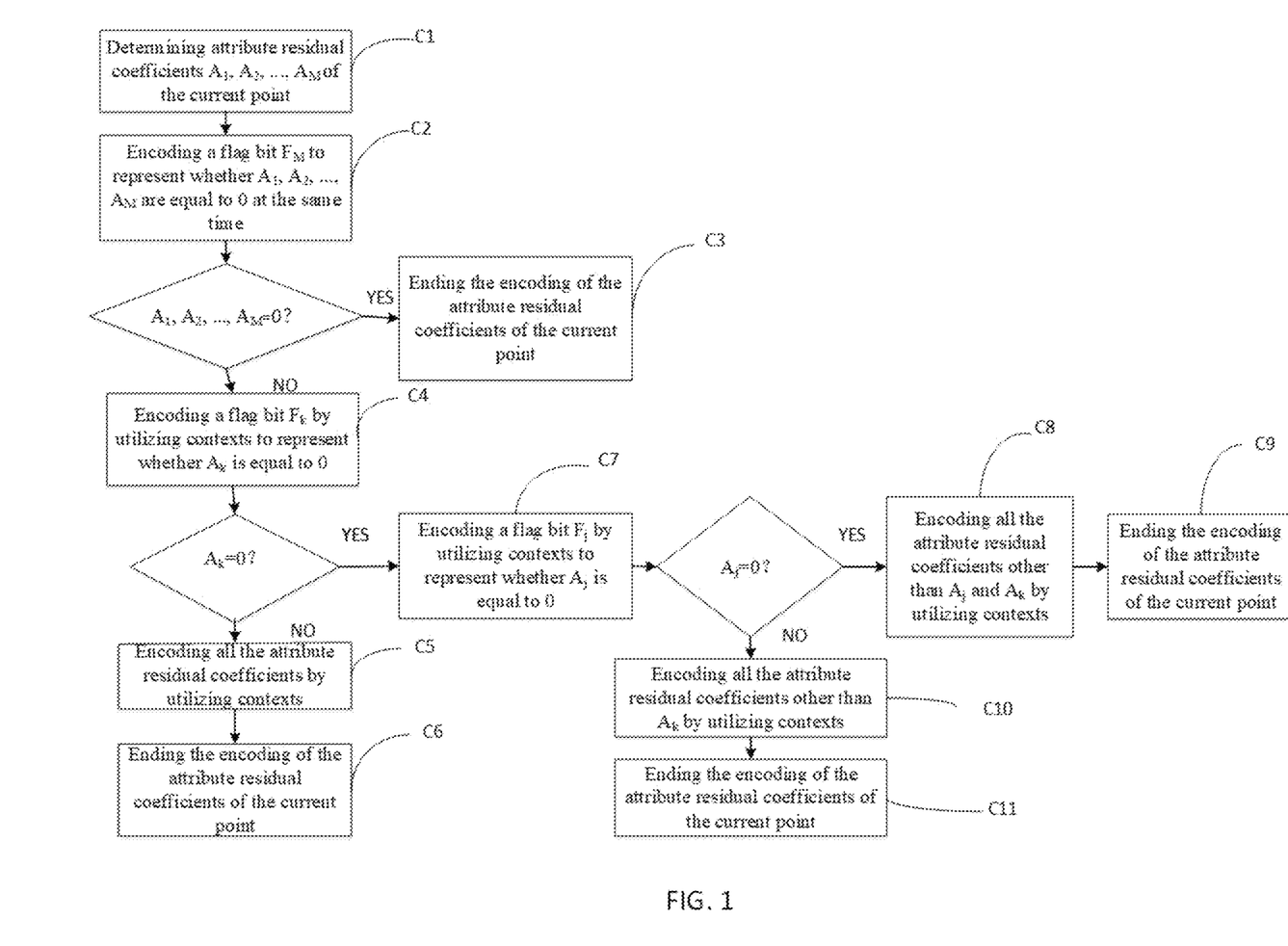
FIG. 1 is a block diagram showing a process of a point cloud attribute entropy encoding method in the present invention.
Figure 3:
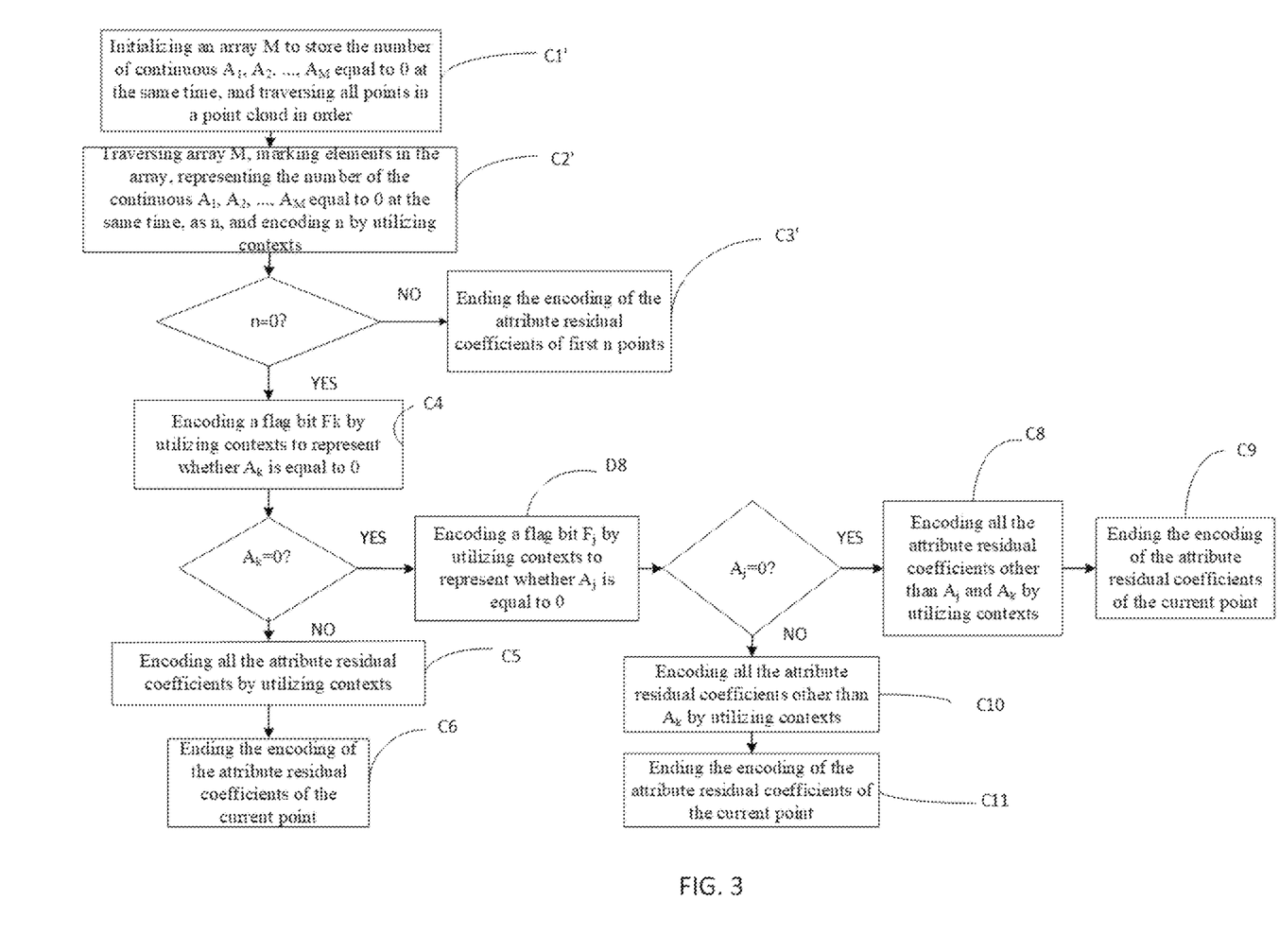
FIG. 3 is a block diagram showing a process of another embodiment of the point cloud attribute entropy encoding method in the present invention, wherein another determination condition is adopted in this embodiment.

As shown in FIG. 1 and FIG. 3, a point cloud attribute entropy encoding method includes the following steps:

C4: a flag bit Fk is encoded by utilizing contexts to represent whether $A_k$ (0<k<=M) is equal to 0;

C5: if $A_k$ is not equal to 0, contexts are adaptively selected to encode uncoded residual coefficients of the current point by utilizing encoded attribute residual coefficients of the current point;

C6: the encoding of the attribute residual coefficients of the current point is ended;

C7: when $A_k$ is equal to 0, it is determined whether a flag bit Fj is encoded to represent that $A_j$ is equal to 0, if $A_k$ is equal to 0, a flag bit Fj is encoded by utilizing contexts to represent whether $A_j$ (0<j<=M, and j is not equal to k) is equal to 0;

C8: when $A_k$ is equal to 0 and $A_j$ is equal to 0, contexts are adaptively selected to encode the uncoded attribute residual coefficients other than $A_j$ and $A_k$ of the current point by utilizing the encoded attribute residual coefficients of the current point;

C9: the encoding of the attribute residual coefficients of the current point is ended;

C10: when $A_k$ is equal to 0 and $A_j$ is not equal to 0, contexts are adaptively selected to encode the uncoded attribute residual coefficients other than $A_k$ of the current point by utilizing the encoded attribute residual coefficients of the current point; and C11: the encoding of the attribute residual coefficients of the current point is ended.

Specifically, C4: the flag bit Fk is encoded by utilizing the contexts to represent whether U or G is equal to 0;

C5: when U or G is not equal to 0, U or G is encoded by utilizing fixed contexts, and contexts are adaptively selected to encode V or B and Y or R by utilizing all encoded attribute residual coefficients prior to the current to-be-encoded attribute residual coefficient;

C6: the encoding of the attribute residual coefficients of the current point is ended;

C7: when U or G is equal to 0, the flag bit Fj is encoded by utilizing the contexts to represent whether V or B is equal to 0;

C8: when U or G is equal to 0 and V or B is equal to 0, Y or R is encoded by utilizing fixed contexts;

C9: the encoding of the attribute residual coefficients of the current point is ended;

C10: when U or G is equal to 0 and V or B is not equal to 0, V or B is encoded by utilizing fixed contexts, and contexts are adaptively selected to encode Y or R by utilizing all encoded attribute residual coefficients prior to the current to-be-encoded attribute residual coefficient; and C11: the encoding of the attribute residual coefficients of the current point is ended.

Preferably, before step C4, method 1 or method 2 is further included, as shown in FIG. 1 and FIG. 3.

Method 1 is shown in FIG. 1,

C1: attribute residual coefficients $A_1, A_2, \ldots, A_M$ of the current point are determined, wherein M is an integer greater than 1;

C2: a flag bit FM is encoded to represent whether $A_1$, $A_2, \ldots, A_M$ are equal to 0 at the same time; and C3: when $A_1, A_2, \ldots, A_M$ are equal to 0 at the same time, the encoding of the attribute residual coefficients of the current point is ended.

Specifically,

C1: attribute residual coefficients Y, U and V or R, G and B of the current point are determined;

C2: a flag bit FM is encoded to represent whether Y, U and V or R, G and B are equal to 0 at the same time; and C3: when Y, U and V or R, G and B are equal to 0 at the same time, the encoding of the attribute residual coefficients of the current point is ended.

Method 2 is shown in FIG. 3,

C1': an array M is initialized to store the number of continuous $A_1, A_2, \ldots, A_M$ equal to 0 at the same time, wherein M is an integer greater than 1;

C2': the array M is traversed, elements in the array, representing the number of the continuous $A_1$, $A_2, \ldots, A_M$ equal to 0 at the same time, are marked as n, and n is encoded by utilizing contexts; and C3': when n is not equal to 0, the encoding of the attribute residual coefficients of first n points is ended.

Specifically,

C1': an array M is initialized to store the number of continuous Y, U and V or R, G and B equal to 0 at the same time;

C2': performing statistics, in order, on the number of the continuous Y, U and V or R, G and B equal to 0 at the same time until the situation that Y, U and V or R, G and B are not equal to 0 at the same time occurs, the number of the continuous Y, U and V or R, G and B equal to 0 at the same time is recorded and marked as n and is stored into the array M, all points in the current point cloud are traversed in order, then, the array M is traversed, and when elements n in the array are not equal to 0, elements n in the array are encoded by utilizing contexts; and when elements n in the array are equal to 0, it represents that Y, U and V or R, G and B are not equal to 0 at the same time, and elements n in the array are encoded by utilizing contexts; and C3': when n is not equal to 0, the encoding of the attribute residual coefficients of first n points is ended.

According to the point cloud attribute entropy encoding method, wherein if the attribute residual coefficient $A_1$ or $A_2, \ldots,$ or $A_M$ of the current point is equal to 0, the attribute residual coefficient is taken as an entropy encoding value, and the entropy encoding value is encoded;

when the encoded attribute residual coefficient A1 or A2, . . . , or AM is not equal to 0 and no flag bits are provided, an absolute value of the attribute residual coefficient is taken as an entropy encoding value, and the entropy encoding value and a sign bit (positive or negative) of the corresponding attribute residual value are encoded; and when the encoded attribute residual coefficient $A_1$ or $A_2, \ldots,$ or $A_M$ is not equal to 0 and flag bits are provided, a difference obtained by subtracting 1 from the absolute value of the attribute residual coefficient is taken as an entropy encoding value, and the entropy encoding value and a sign bit (positive or negative) of the corresponding attribute residual value are encoded.

Specifically, if the attribute residual coefficient (Y or U or V or R or G or B) of the current point is equal to 0, the attribute residual coefficient is taken as an entropy encoding value, and the entropy encoding value is encoded;

when the encoded attribute residual coefficient (Y or U or V or R or G or B) is not equal to 0 and no flag bits are provided, an absolute value of the attribute residual coefficient is taken as an entropy encoding value, and the entropy encoding value and a sign bit (positive or negative) of the corresponding attribute residual coefficient are encoded; and when the encoded attribute residual coefficient (Y or U or V or R or G or B) is not equal to 0 and flag bits are provided, a difference obtained by subtracting 1 from the absolute value of the attribute residual coefficient is taken as an entropy encoding value, and the entropy encoding value and a sign bit (positive or negative) of the corresponding attribute residual coefficient are encoded. the step that the entropy encoding value is encoded specifically includes:

a flag bit is encoded by utilizing contexts to represent whether the entropy encoding value is equal to 0; if the entropy encoding value is not equal to 0, a flag bit is encoded by utilizing contexts to represent whether the entropy encoding value is equal to 1; if the entropy encoding value is not equal to 1, a flag bit is encoded by utilizing contexts to represent whether the entropy encoding value is equal to 2; the operation is performed successively until a flag bit is encoded by utilizing contexts to represent whether the entropy encoding value is equal to n (n is greater than 0); and if the entropy encoding value is not equal to n, a difference obtained by subtracting n+1 from this value is encoded.

Specifically, method 1: a flag bit is encoded by utilizing contexts to represent whether it is equal to 0, if yes, the encoding is ended; then, a flag bit is encoded by utilizing contexts to represent whether it is equal to 1, if yes, the encoding is ended; then, a flag bit is encoded by utilizing contexts to represent whether it is equal to 2, if yes, the encoding is ended, if not, a value obtained by subtracting 3 from this value is further encoded, and the encoding is ended.

Method 2: a flag bit is encoded by utilizing contexts to represent whether it is equal to 0, if yes, the encoding is ended; then, a flag bit is encoded by utilizing contexts to represent whether it is equal to 1, if yes, the encoding is ended, if not, a value obtained by subtracting 2 from this value is further encoded, and the encoding is ended.

Preferably, the step that contexts are adaptively selected to encode uncoded residual coefficients of the current point by utilizing encoded attribute residual coefficients of the current point specifically includes:

for an encoded attribute residual coefficient $A_t$ of the current point, H flag bits $b_{t0}, b_{t1}, \ldots, b_{t(H-1)}$ are set, wherein $b_{th}$ represents whether $A_t$ is equal to h, and h=0, 1, . . . , H−1; and for r encoded attribute residual coefficients of the current point, the uncoded residual coefficients of the current point are encoded by taking r*H flag bits as contexts.

Specifically, there are two encoded attribute residual coefficients U or G and V or B prior to the current to-be-encoded attribute residual coefficient Y or R, three flag bits are set, contexts are adaptively selected to encode Y or R, and there are $2^{2*3}=64$ contexts in total.

A point cloud attribute entropy encoding device includes a processor, a memory and a communication bus; the memory stores a computer readable program executable for the processor; the communication bus implements connection communication between the processor and the memory; and the processor, when executing the computer readable program, implements the steps of the point cloud attribute entropy encoding method.

Figure 2:
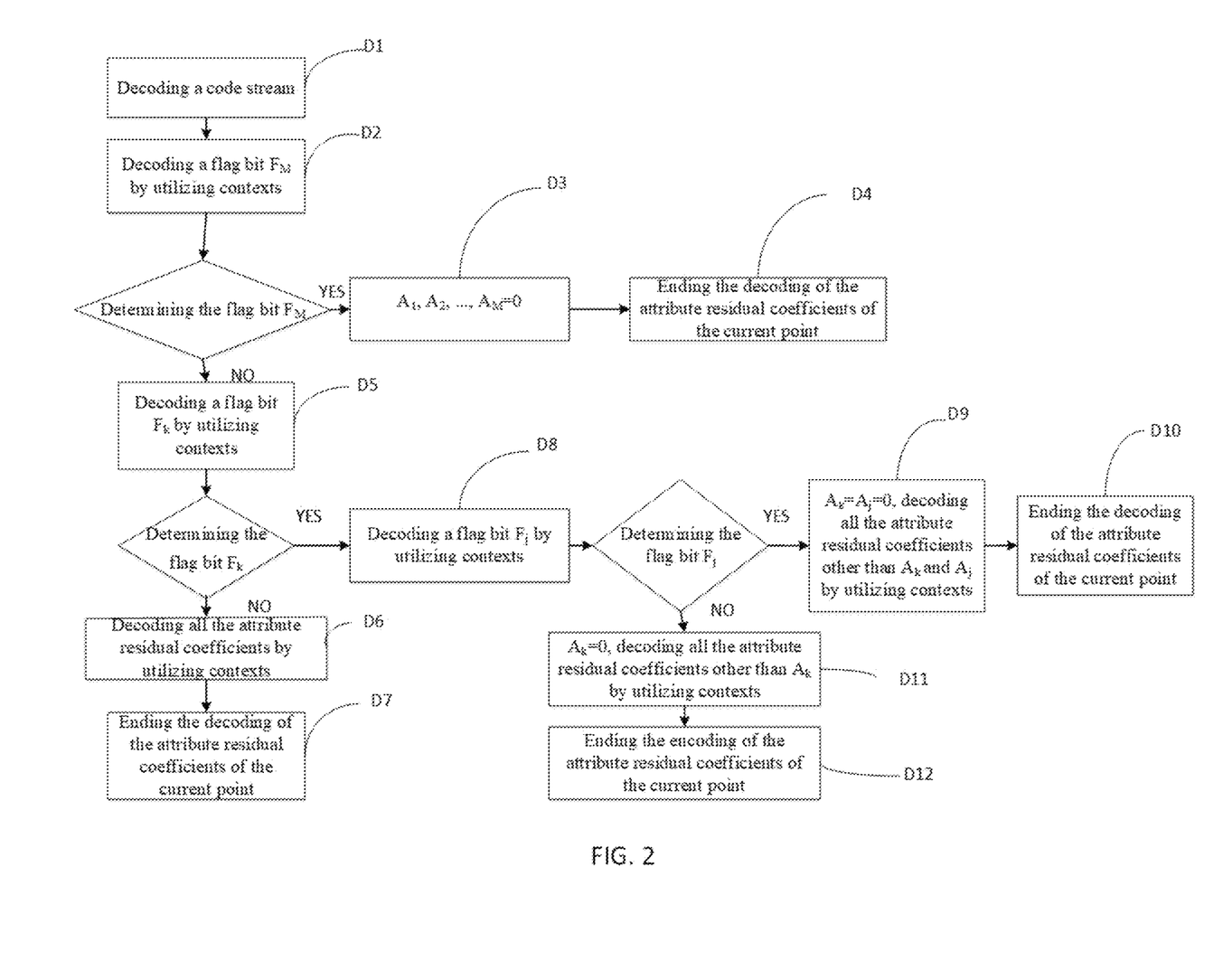
FIG. 2 is a block diagram showing a process of a point cloud attribute entropy decoding method in the present invention.
Figure 4:
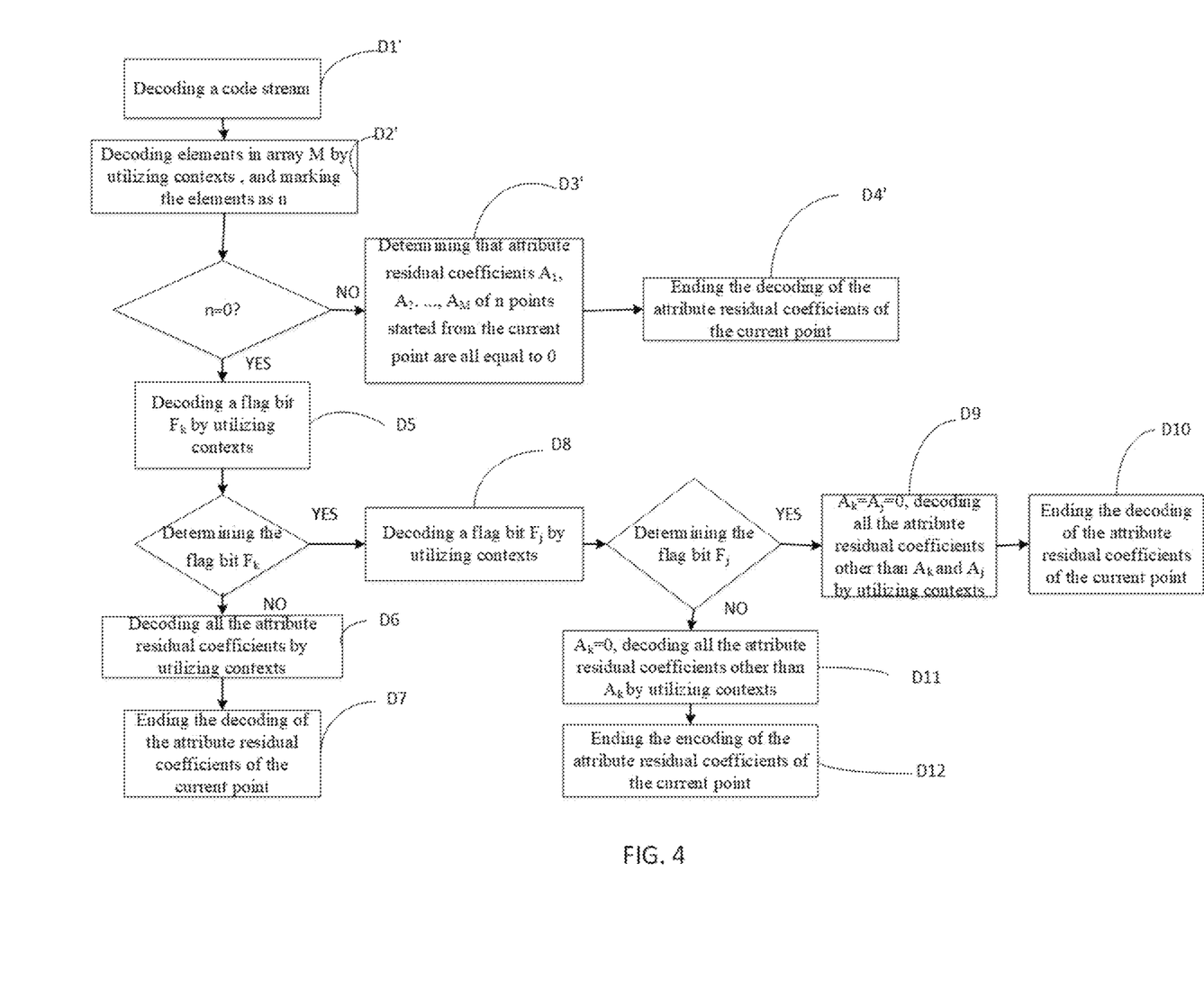
FIG. 4 is a block diagram showing a process of another embodiment of the point cloud attribute entropy decoding method in the present invention, wherein another determination condition is adopted in this embodiment.

As shown in FIG. 2 and FIG. 4, a point cloud attribute entropy decoding method includes the following steps:
- D5: a flag bit Fk is decoded, and the flag bit Fk is determined;
- D6: if the flag bit Fk is determined to be negative, contexts are adaptively selected to decode all attribute residual coefficients by utilizing decoded attribute residual coefficients;
- D7: the decoding of the attribute residual coefficients of the current point is ended;
- D8: if the flag bit Fk is determined to be positive, a flag bit Fj is decoded, and the flag bit Fj is determined;
- D9: if the flag bit Fk is determined to be positive and the flag bit Fj is determined to be positive, $A_k=A_j=0$, contexts are adaptively selected to decode all attribute residual coefficients other than $A_k$ and $A_j$ by utilizing decoded attribute residual coefficients;
- D10: the decoding of the attribute residual coefficients of the current point is ended;
- D11: if the flag bit Fk is determined to be positive and the flag bit Fj is determined to be negative, $A_k=0$, contexts are adaptively selected to decode all attribute residual coefficients other than $A_k$ by utilizing decoded attribute residual coefficients; and
- D12: the decoding of the attribute residual coefficients of the current point is ended.

Specifically,
- D5: a flag bit Fk is decoded by utilizing contexts, and the flag bit Fk is determined;
- D6: if the flag bit Fk is determined to be negative, decoding is performed by utilizing fixed contexts to obtain U or G, and contexts are adaptively selected to decode V or B and Y or R by utilizing all decoded attribute residual coefficients prior to the current to-be-decoded attribute residual coefficient;
- D7: the decoding of the attribute residual coefficients of the current point is ended;
- D8: if the flag bit Fk is determined to be positive, a flag bit Fj is decoded by utilizing contexts, and the flag bit Fj is determined;
- D9: if the flag bit Fk is determined to be positive and the flag bit Fj is determined to be positive, U or G is equal to 0 and V or B is equal to 0, decoding is performed by utilizing fixed contexts to obtain Y or R;
- D10: the decoding of the attribute residual coefficients of the current point is ended;
- D11: if the flag bit Fk is determined to be positive and the flag bit Fj is determined to be negative, U or G is equal to 0 and V or B is not equal to 0, decoding is performed by utilizing fixed contexts to obtain V or B, and then, contexts are adaptively selected to decode Y or R by utilizing all decoded attribute residual coefficients prior to the current to-be-decoded attribute residual coefficient; and
- D12: the decoding of the attribute residual coefficients of the current point is ended.

In another embodiment of the point cloud attribute entropy decoding method, before D5, method 3 is further included, and steps of method 3 are shown in FIG. 2:

- D1: a code stream is decoded;
- D2: a flag bit FM is decoded, and the flag bit FM is determined;
- D3: if the flag bit FM is determined to be positive, attribute residual coefficients $A_1, A_2, \ldots, A_M$ are equal to 0 at the same time; and
- D4: the decoding of the attribute residual coefficients of the current point is ended.

Specifically, D1: a code stream is decoded;
- D2: a flag bit FM is decoded by utilizing contexts, and the flag bit FM is determined;
- D3: if the flag bit FM is determined to be positive, it represents that Y, U and V or R, G and B are equal to 0 at the same time; and
- D4: the decoding of the attribute residual coefficients of the current point is ended.

Before D5, method 4 is further included, and steps of method 4 are shown in FIG. 4:
- D1: a code stream is decoded;
- D2': elements in array M are decoded by utilizing contexts and are marked as n, and it is determined whether n is equal to 0;
- D3': when n is not equal to 0, attribute residual coefficients $A_1, A_2, \ldots, A_M$ of n points started from the current point are all equal to 0; and when n is equal to 0, it represents that $A_1, A_2, \ldots, A_M$ are not equal to 0 at the same time; and
- D4': the decoding of the attribute residual coefficients of the current point is ended.

Specifically,
- D1: a code stream is decoded;
- D2': values of elements in array M are decoded by utilizing contexts and are marked as n; and
- D3': n is determined, if n is not equal to 0, Y, U and V or R, G and B of n points started from the current point are all equal to 0, and the decoding of attribute residual coefficients of the first n points is ended; and if decoded n is equal to 0, it represents that Y, U and V or R, G and B are not equal to 0 at the same time.

According to the point cloud attribute entropy decoding method, wherein
decoding is performed to obtain an entropy decoding value, and when the entropy decoding value is equal to 0, the entropy decoding value is taken as the attribute residual coefficient $A_1$ or $A_2, \ldots,$ or $A_M$;

when the entropy decoding value is not equal to 0 and no flag bits are provided, the entropy decoding value is taken as an absolute value of the attribute residual coefficient $A_1$ or $A_2, \ldots,$ or $A_M$, and decoding is performed to obtain a sign bit (positive or negative) of the attribute residual coefficient $A_1$ or $A_2, \ldots,$ or $A_M$; and when the entropy decoding value is not equal to 0 and flag bits are provided, a sum obtained by adding 1 to the entropy decoding value is taken as the absolute value of the attribute residual coefficient $A_1$ or $A_2, \ldots,$ or $A_M$, and decoding is preformed to obtain a sign bit (positive or negative) of the attribute residual coefficient $A_1$ or $A_2, \ldots,$ or $A_M$.

Specifically,
decoding is performed to obtain an entropy decoding value, and when the entropy decoding value is equal to 0, the entropy decoding value is taken as an attribute residual coefficient Y or U or V or R or G or B;

when the entropy decoding value is not equal to 0 and no flag bits are provided, the entropy decoding value is taken as an absolute value of the attribute residual coefficient Y or U or V or R or G or B, and decoding is performed to obtain a sign bit (positive or negative) of the attribute residual coefficient Y or U or V or R or G or B; and when the entropy decoding value is not equal to 0 and flag bits are provided, a sum obtained by adding 1 to the entropy decoding value is taken as the absolute value of the attribute residual coefficient Y or U or V or R or G or B, and decoding is preformed to obtain a sign bit (positive or negative) of the attribute residual coefficient Y or U or V or R or G or B.

the step that the entropy decoding value is decoded specifically includes:

a flag bit is decoded by utilizing contexts to represent whether the entropy decoding value is equal to 0; if the entropy decoding value is not equal to 0, a flag bit is decoded by utilizing contexts to represent whether the entropy decoding value is equal to 1; if the entropy decoding value is not equal to 1, a flag bit is decoded by utilizing contexts to represent whether the entropy decoding value is equal to 2; the operation is performed successively until a flag bit is decoded by utilizing contexts to represent whether the entropy decoding value is equal to n (n is greater than 0); and if the entropy decoding value is not equal to n, a sum obtained by adding n+1 to the value obtained by decoding is taken as the entropy decoding value.

Specifically, method 3: a flag bit is decoded by utilizing contexts to determine whether it is equal to 0, if yes, the decoding is ended; then, a flag bit is decoded by utilizing contexts to determine whether it is equal to 1, if yes, the decoding is ended; then, a flag bit is decoded by utilizing contexts to determine whether it is equal to 2, if yes, the decoding is ended, if not, decoding is performed again to obtain a value, and then, the value obtained by decoding is added with 3 to obtain the final entropy decoding value.

Method 4: a flag bit is decoded by utilizing contexts to determine whether it is equal to 0, if yes, the decoding is ended; then, a flag bit is decoded by utilizing contexts to determine whether it is equal to 1, if yes, the decoding is ended, if the decoding is not ended, decoding is performed again to obtain a value, and then, the value obtained by decoding is added with 2 to obtain the final entropy decoding value.

Preferably, the step that contexts are adaptively selected to decode undecoded residual coefficients of the current point by utilizing decoded attribute residual coefficients of the current point specifically includes:

for a decoded attribute residual coefficient $A_t$ of the current point, H flag bits $b_{t0}, b_{t1}, \ldots, b_{t(H-1)}$ are set, wherein $b_{th}$ represents whether $A_t$ is equal to h, and h=0, 1, . . . , H−1; and for r decoded attribute residual coefficients of the current point, the undecoded attribute residual coefficients of the current point are decoded by taking r*H flag bits as contexts.

Specifically, there are two decoded attribute residual coefficients U or G and V or B prior to the current to-be-decoded attribute residual coefficient Y or R, three flag bits are set, contexts are adaptively selected to decode Y or R, and there are $2^{2*3}=64$ contexts in total.

A point cloud attribute entropy decoding device includes a processor, a memory and a communication bus; the memory stores a computer readable program executable for the processor; the communication bus implements connection communication between the processor and the memory; and the processor, when executing the computer readable program, implements the steps of the point cloud attribute entropy decoding method.

In order to verify the effect of the present invention, the performances in the embodiments of the methods in the present invention are compared with the performances of reference results of a test platform PCRMv1.0 and a test platform TMC13v12.

Embodiment 1: for the test platform PCRMv1.0, FIG. 1 and FIG. 2 are adopted in this solution, and table 1 is a diagram for comparison with the test platform PCRMv1.0 under four conditions.

TABLE 1

Comparison with Platform PCRMv1.0

| | End-to-end attribute rate distortion (intra-frame) | | |
|---|---|---|---|
| | Luminance | Chrominance Cb | Chrominance Cr |
| Finitely lossy geometry, lossy attribute (C1) | | | |
| First kind of dataset B | −0.9% | −0.8% | −0.7% |
| Third kind of dataset | −2.0% | −1.1% | −1.3% |
| Average | −1.3% | −0.9% | −0.9% |
| Lossless geometry, lossy attribute (C2) | | | |
| First kind of dataset B | −1.8% | −1.4% | −1.3% |
| Third kind of dataset | −10.7% | −6.8% | −8.5% |
| Average | −5.0% | −3.4% | −3.9% |
| Lossless geometry, finitely lossy attribute (C3) | | | |
| First kind of dataset B | −4.8% | −4.8% | −4.8% |
| Third kind of dataset | −9.3% | −9.3% | −9.3% |
| Average | −6.5% | −6.5% | −6.5% |

| | End-to-end attribute rate distortion (intra-frame) | | |
|---|---|---|---|
| | Entire | Geometry | Color |
| Lossless geometry, lossless attribute (C4) | | | |
| First kind of dataset B | 99.0% | 100.0% | 97.9% |
| Third kind of dataset | 98.3% | 100.0% | 98.1% |
| Average | 99.5% | 100.0% | 97.9% |

It can be seen from table 1 that:

for the attribute of luminance, the end-to-end rate distortion in the present invention is saved by 1.3% under the conditions of a finitely lossy geometry and a lossy attribute;

for the attribute of chrominance Cb, the end-to-end rate distortion in the present invention is saved by 0.9% under the conditions of a finitely lossy geometry and a lossy attribute;

for the attribute of chrominance Cr, the end-to-end rate distortion in the present invention is saved by 0.9% under the conditions of a finitely lossy geometry and a lossy attribute;

for the attribute of luminance, the end-to-end rate distortion in the present invention is saved by 5.0% under the conditions of a lossless geometry and a lossy attribute;

for the attribute of chrominance Cb, the end-to-end rate distortion in the present invention is saved by 3.4% under the conditions of a lossless geometry and a lossy attribute;

for the attribute of chrominance Cr, the end-to-end rate distortion in the present invention is saved by 3.9% under the conditions of a lossless geometry and a lossy attribute; and for the attributes of luminance, chrominance Cb and chrominance Cr, the end-to-end rate distortion in the present invention is saved by 6.5% under the conditions of a lossless geometry and a finitely lossy attribute; and a color code rate in the present invention is only required to be 97.9% under the conditions of a lossless geometry and a lossless attribute.

Embodiment 2: for the test platform TMC13v12, FIG. 3 and FIG. 4 are adopted in this solution, and table 2 is a diagram for comparison with the test platform TMC13v12 under four conditions.

TABLE 2

Comparison with Platform TMC13v12

| | End-to-end attribute rate distortion (intra-frame) | | |
| --- | --- | --- | --- |
| | Luminance | Chrominance Cb | Chrominance Cr |
| Lossless geometry, lossy attribute (C1) | | | |
| First kind of dataset A | −0.2% | −0.2% | −0.2% |
| First kind of dataset B | −0.2% | −0.2% | −0.2% |
| Fused data set of third kind of data set | −0.2% | −0.2% | −0.2% |
| Lossy geometry, lossy attribute (C2) | | | |
| First kind of dataset A | −0.2% | −0.2% | −0.2% |
| First kind of dataset B | −0.2% | −0.2% | −0.2% |
| Fused data set of third kind of data set | −0.2% | −0.2% | −0.2% |
| Average | −0.2% | −0.2% | −0.2% |

| | End-to-end attribute rate distortion (intra-frame) | | |
| --- | --- | --- | --- |
| | Entire | Geometry | Color |
| Lossless geometry, lossless attribute (CW) | | | |
| First kind of dataset A | 99.8% | 100.0% | 99.8% |
| First kind of dataset B | 99.9% | 100.0% | 99.7% |
| Fused data set of third kind of data set | 99.9% | 100.0% | 99.8% |
| Average | 99.9% | 100.0% | 99.7% |

| | End-to-end attribute rate distortion (intra-frame) | | |
| --- | --- | --- | --- |
| | Luminance | Chrominance Cb | Chrominance Cr |
| Lossless geometry, finitely lossy attribute (CY) | | | |
| First kind of dataset A | 0.0% | 0.0% | 0.0% |
| First kind of dataset B | 0.0% | 0.0% | 0.0% |
| Fused data set of third kind of data set | −0.3% | −0.3% | −0.3% |
| Average | 0.0% | 0.0% | 0.0% |

As shown in table 2, for the attributes of luminance, chrominance Cb and chrominance Cr, the end-to-end rate distortion in the present invention is saved by 0.2% under the conditions of a lossless geometry and a lossy attribute;

for the attributes of luminance, chrominance Cb and chrominance Cr, the end-to-end rate distortion in the present invention is saved by 0.2% under the conditions of a lossy geometry and a lossy attribute; and a color code rate in the present invention is only required to be 99.7% under the conditions of a lossless geometry and a lossless attribute.

The above-mentioned embodiments are merely specific implementations of the present invention and are intended to illustrate the technical solutions of the present invention, rather than to limit them, and the protection scope of the present invention is not limited thereto. Although the present invention has been described in detail with reference to the aforementioned embodiments, it should be understood by a person of ordinary skill in the art that modifications or readily-envisioned variations of the technical solutions recorded in the aforementioned embodiments or equivalent substitutions of parts of technical features thereof can be still made by any one skilled in the art within the technical scope disclosed by the present invention; and these modifications, variations or substitutions do not enable the essences of the corresponding technical solutions to depart from the spirits and scopes of the technical solutions of the embodiments of the present invention and shall fall within the protection scope of the present invention. Therefore, the protection scope of the present invention should be subject to the protection scope defined in the claims.

INDUSTRIAL APPLICABILITY

The point cloud attribute entropy encoding method and device, and the point cloud attribute entropy decoding method and device provided by the present invention are applicable to the field of digitized industry in the real world, and high-precision point cloud processing is widely applied to the construction of an urban digital map and plays a technical support role in various hot researches such as smart cities, unmanned driving and heritage preservation. According to the point cloud attribute entropy encoding method and device, and the point cloud attribute entropy decoding method and device provided by the present invention, redundant information in a point cloud is better utilized, and the compression performance is improved. Therefore, an attribute entropy encoder and an attribute entropy decoder in the present invention are more efficient.

The invention claimed is:

1. A point cloud attribute entropy encoding method, comprising:

for attribute residual coefficients $A_1, A_2, \ldots, A_M$ of a current point, M being an integer greater than 1, determining whether the M attribute residual coefficients $A_1, A_2, \ldots, A_M$ are equal to 0 at the same time;

if the M attribute residual coefficients $A_1, A_2, \ldots, A_M$ are equal to 0 at the same time, the encoding of the attribute residual coefficients of the current point is ended;

if the M attribute residual coefficients $A_1, A_2, \ldots, A_M$ are not equal to 0 at the same time, the encoding a flag bit $F_k$ by utilizing contexts to represent whether $A_k$ is equal to 0, 0<k<=M;

determining whether $A_k$ is equal to 0;

if $A_k$ is not equal to 0, adaptively selecting contexts to encode uncoded residual coefficients of the current point by utilizing encoded attribute residual coefficients of the current point;

ending the encoding of the attribute residual coefficients of the current point;

if $A_k$ is equal to 0, encoding a flag bit $F_j$ by utilizing contexts to represent whether $A_j$ is equal to 0, 0<j<=M, and j is not equal to k;

determining whether $A_j$ is equal to 0;

if $A_j$ is equal to 0, adaptively selecting contexts to encode the uncoded attribute residual coefficients other than $A_j$ and $A_k$ of the current point by utilizing the encoded attribute residual coefficients of the current point;

ending the encoding of the attribute residual coefficients of the current point;

if $A_j$ is not equal to 0, adaptively selecting contexts to encode the uncoded attribute residual coefficients other than $A_k$ of the current point by utilizing the encoded attribute residual coefficients of the current point; and ending the encoding of the attribute residual coefficients of the current point.

2. The point cloud attribute entropy encoding method of claim 1, wherein if the attribute residual coefficient $A_1$ or $A_2, \ldots,$ or $A_M$ of the current point is equal to 0, the attribute residual coefficient is taken as an entropy encoding value, and the entropy encoding value is encoded;

when the encoded attribute residual coefficient $A_1$ or $A_2, \ldots,$ or $A_M$ is not equal to 0 and no flag bits are provided, an absolute value of the attribute residual coefficient is taken as an entropy encoding value, and the entropy encoding value and a positive or negative sign bit of the corresponding attribute residual value are encoded; and when the encoded attribute residual coefficient $A_1$ or $A_2, \ldots,$ or $A_M$ is not equal to 0 and flag bits are provided, a difference obtained by subtracting 1 from the absolute value of the attribute residual coefficient is taken as an entropy encoding value, and the entropy encoding value and a positive or negative sign bit of the corresponding attribute residual value are encoded.

3. The point cloud attribute entropy encoding method of claim 2, wherein the step of encoding the entropy encoding value specifically comprises:

encoding a flag bit by utilizing contexts to represent whether the entropy encoding value is equal to 0;

if the entropy encoding value is not equal to 0, encoding a flag bit by utilizing contexts to represent whether the entropy encoding value is equal to 1;

if the entropy encoding value is not equal to 1, encoding a flag bit by utilizing contexts to represent whether the entropy encoding value is equal to 2;

performing the operation successively until a flag bit is encoded by utilizing contexts to represent whether the entropy encoding value is equal to n, n is greater than 0; and if the entropy encoding value is not equal to n, encoding a difference obtained by subtracting n+1 from this value.

4. The point cloud attribute entropy encoding method of claim 1, wherein the step of adaptively selecting contexts to encode uncoded residual coefficients of the current point by utilizing encoded attribute residual coefficients of the current point specifically comprises:

for an encoded attribute residual coefficient $A_t$ of the current point, setting H flag bits $b_{t0}, b_{t1}, \ldots, bt_{(H-1)}$, wherein $b_{th}$ represents whether $A_t$ is equal to h, and h=0, 1, ..., H−1; and for r encoded attribute residual coefficients of the current point, encoding the uncoded residual coefficients of the current point by taking a number of r/H flag bits as contexts.

5. A point cloud attribute entropy decoding method, comprising:

a code stream being decoded;

for attribute residual coefficients $A_1, A_2, \ldots, A_M$ of the current point, M being an integer greater than 1, determining whether the M attribute residual coefficients $A_1, A_2, \ldots, A_M$ are equal to 0 at a same time;

if the M attribute residual coefficients $A_1, A_2, \ldots, A_M$ are equal to 0 at the tame time, the decoding of the attribute residual coefficients of the current point is ended;

if the M attribute residual coefficients $A_1, A_2, \ldots, A_M$ are not equal to 0 at the same time, decoding a flag bit $F_k$ by utilizing contexts to represent whether $A_k$ is equal to 0, 0<k<=M;

determining whether $A_k$ is equal to 0;

if $A_k$ is not equal to 0, adaptively selecting contexts to decode undecoded residual coefficients of the current point by utilizing decoded attribute residual coefficients of the current point;

ending the decoding of the attribute residual coefficients of the current point;

if $A_k$ is equal to 0, decoding a flag bit $F_j$ by utilizing contexts to represent whether $A_j$ is equal to 0, 0<j<=M, and j is not equal to k;

determining whether $A_j$ is equal to 0;

if $A_j$ is equal to 0, adaptively selecting contexts to decode the undecoded attribute residual coefficients other than $A_j$ and $A_k$ of the current point by utilizing the decoded attribute residual coefficients of the current point;

ending the decoding of the attribute residual coefficients of the current point;

if $A_j$ is not equal to 0, adaptively selecting contexts to decode the undecoded attribute residual coefficients other than $A_k$ of the current point by utilizing the decoded attribute residual coefficients of the current point;

ending the encoding of the attribute residual coefficients of the current point.

6. The point cloud attribute entropy decoding method of claim 5, wherein decoding is performed to obtain an entropy decoding value, and when the entropy decoding value is equal to 0, the entropy decoding value is taken as the attribute residual coefficient $A_1$ or $A_2$, ..., or $A_M$;

when the entropy decoding value is not equal to 0 and no flag bits are provided, the entropy decoding value is taken as an absolute value of the attribute residual coefficient $A_1$ or $A_2$, ..., or $A_M$, and decoding is performed to obtain a positive or negative sign bit of the attribute residual coefficient $A_1$ or $A_2$, ..., or $A_M$; and when the entropy decoding value is not equal to 0 and flag bits are provided, a sum obtained by adding 1 to the entropy decoding value is taken as the absolute value of the attribute residual coefficient $A_1$ or $A_2$, ..., or $A_M$, and decoding is preformed to obtain a positive or negative sign bit of the attribute residual coefficient $A_1$ or $A_2$, ..., or $A_M$.

7. The point cloud attribute entropy decoding method of claim 6, wherein the step that decoding is performed to obtain an entropy decoding value specifically comprises:

decoding a flag bit by utilizing contexts to represent whether the entropy decoding value is equal to 0;

if the entropy decoding value is not equal to 0, decoding a flag bit by utilizing contexts to represent whether the entropy decoding value is equal to 1;

if the entropy decoding value is not equal to 1, decoding a flag bit by utilizing contexts to represent whether the entropy decoding value is equal to 2;

performing the operation successively until a flag bit is decoded by utilizing contexts to represent whether the entropy decoding value is equal to n, n is greater than 0; and if the entropy decoding value is not equal to n, taking a sum obtained by adding n+1 to a value obtained by decoding as the entropy decoding value.

8. The point cloud attribute entropy decoding method of claim 5, wherein the step of adaptively selecting contexts to decode undecoded residual coefficients of the current point by utilizing decoded attribute residual coefficients of the current point specifically comprises:

for a decoded attribute residual coefficient $A_t$ of the current point, setting H flag bits $b_{t0}, b_{t1}, \ldots, b_{t(H-1)}$, wherein $b_{th}$ represents whether $A_t$ is equal to h, and h=0, 1, ..., H−1; and for r decoded attribute residual coefficients of the current point, decoding the undecoded attribute residual coefficients of the current point by taking a number of r×H flag bits as contexts.

9. A point cloud attribute entropy decoding device, comprising a processor, a memory and a communication bus; the memory storing a computer readable program executable for the processor;

the communication bus implementing connection communication between the processor and the memory; and the processor, when executing the computer readable program, implementing the steps of the point cloud attribute entropy decoding method of claim 5.

* * * * *